Feb. 21, 1950   N. STRAUS   2,498,590
CURTAIN ROD BRACKET
Filed April 12, 1946

INVENTOR.
NATHAN STRAUS
BY
Williams, Rich & Morse
ATTORNEYS

Patented Feb. 21, 1950

2,498,590

UNITED STATES PATENT OFFICE 2,498,590

CURTAIN ROD BRACKET

Nathan Straus, New York, N. Y.

Application April 12, 1946, Serial No. 661,461

2 Claims. (Cl. 248—264)

This invention relates to curtain rod supporting brackets, more particularly to brackets for supporting the common type of cylindrical metal curtain rods, either solid or tubular.

The most common type of bracket currently in use for rods of this type consists of an attaching plate which is fastened to the woodwork and which carries a short externally threaded stud onto which is screwed a cylindrical sleeve internally threaded at one end.

The principal object of this invention is to provide an improved supporting bracket in which the sleeve can be snapped on and off the stud carried by the attaching plate with greater speed and ease.

Another object is to provide a bracket which is more economically manufactured.

A further object is to provide a bracket having parts which are easier to clean in the event that they are accidentally smeared with paint or the like.

The invention will best be understood from the following description of the present preferred embodiment thereof, taken in conjunction with the drawings in which.

Figure 1:
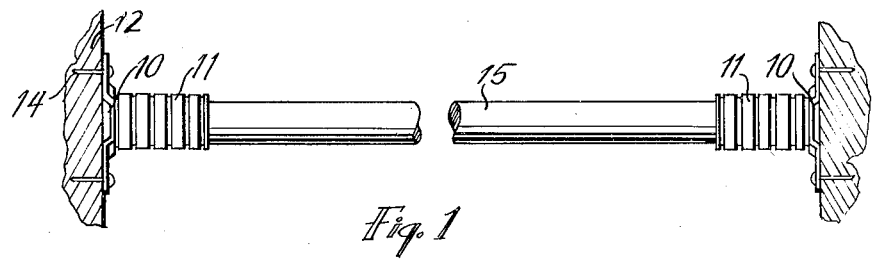
Fig. 1 is an elevation of a pair of brackets secured to the inside of a window frame or the like and supporting a rod.

Referring to Fig. 1, the brackets of the invention, comprising the attaching plate 10 and the sleeve 11, may be fastened to the woodwork 12 surrounding a window or the like by means of nails 14 to support a rod 15 in the usual manner.

Figure 2:
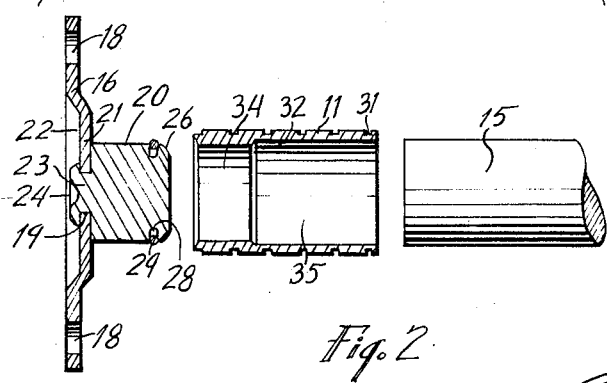
Fig. 2 is an exploded sectional view showing the attaching plate and the stud carried thereby, the sleeve and the end of a rod.
Figure 3:
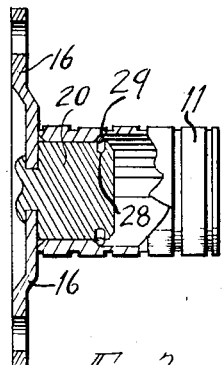
Fig. 3 is a central section through an assembled bracket.
Figure 4:
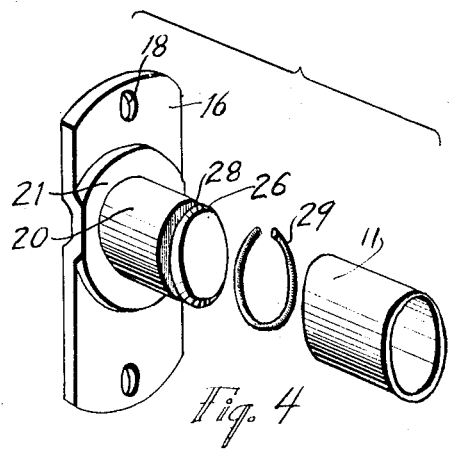
Fig. 4 is an exploded perspective of the parts making up a complete bracket.

Referring to Figs. 2, 3 and 4, the bracket of the invention has an attaching plate 16, provided with nail-holes 18, and a centrally located opening 19 in which is secured a stud 20. The central part of the plate 16 is stamped out to form a raised portion 21 which provides a space 22 behind the plate. The stud 20 is formed with a reduced portion or stem 23 which passes through the opening 19 and is riveted over or flared at 24 to secure the stud to the plate. The space 22 accommodates the flared portion of the stud and permits the plate 16 to be placed flush against a flat surface.

The diameter of the raised portion 21 of the plate 16 is preferably at least coextensive with the outside diameter of the sleeve 11 so that a flat seat is provided for the inner end of the sleeve where it abuts the attaching plate.

The forward edge of the stud 20 is slightly chamfered at 26 and immediately behind this chamfer the stud is provided with a circumferential groove 28 in which there is placed a spring 29 in the form of a split circular ring. The spring slides freely in this groove. Groove 28 is of a depth sufficient to permit the contraction of the spring to an outside diameter no greater than that of the stud. For use on a stud having a diameter of .365", for example, the normal outside diameter of the spring 29 may be about .375" so that the spring extends but slightly beyond the surface of the stud.

The sleeve 11 is provided on its external surface with grooves 31 or other surface roughening to aid in gripping it. The bore of this sleeve is of two different diameters so as to provide an internal circumferential shoulder 32. The smaller bore 34 is of a diameter to fit closely on the stud 20 and smaller than the normal outside diameter of the spring 29, so that pushing the sleeve over the stud contracts the spring. The length of this bore is equal to or slightly less than the distance between the raised portion 21 of plate 16 and the spring 29. Since the bore 35 is larger than the bore 34, when the sleeve 30 is pushed over the stud 20 the spring 29 expands behind the shoulder 32 as shown in Fig. 3. Bore 35 receives and supports the end of rod 15.

It will be noted that with the construction described the stud may be made by very simple screw-machine operations due to the absence of threads and similarly, in the sleeve 11 the formation of the two bores 34 and 35 and the shoulder 32 may be accomplished by a simple reaming operation which does not require any reversal of direction as is usually required for the removal of threading tools. It has been found that the shoulder 32 need not be of very great depth to secure the sleeve firmly in place on the stud. For example a shoulder depth of .010" is quite satisfactory for use on a stud of .365" diameter and this requires the removal of very little metal from the inside of the tubing from which the sleeve is formed.

The structure of the stud is such that it is very difficult in the ordinary course of use to so damage it as to make it inoperative. The threaded studs commonly in use are very easily spoiled by injury to the threads or by the accidental smearing of them with paint, which is removed from a threaded surface only with great difficulty. Wet paint may easily be wiped from the smooth stud to leave a clean surface and dried paint can readily be scraped off.

In use the attaching plate is fastened to the selected location in the usual manner by means of nails or screws. The sleeve 11 is slipped over the end of the rod, the rod placed in alinement with the stud and the sleeve simply pushed toward the attaching plate until it snaps in place. The sleeve is removed simply by pulling it off and thus the installation and removal of curtain rods is made easier.

The foregoing detailed description is to be regarded as merely illustrative of the invention which is to be construed broadly within the purview of the claims.

What is claimed is:

1. A curtain rod supporting bracket comprising, an attaching plate having a stud, said stud being cylindrical adjacent said plate and having a circumferential groove spaced therefrom, a compressible spring positioned in said groove and normally extending beyond the surface of the stud, and a removable sleeve having a continuous cylindrical bore of two different diameters so as to provide an internal circumferential shoulder, the smaller portion of the bore of said sleeve being of a size to have a close sliding fit on the stud and of a length substantially the same as the distance between said plate and said spring so that said spring engages with said shoulder to retain the sleeve on the stud when the sleeve is pushed over the spring onto the stud.

2. A curtain rod supporting bracket comprising, an attaching plate, a stud carried by said plate and having a circumferential groove, a compressible spring lying in said groove, a removable sleeve having a bore, said bore being partly of a diameter to have a sliding fit on said stud and partly of a larger diameter whereby said sleeve has an internal circumferential shoulder, that part of the sleeve having the smaller bore being of a length substantially equal to the distance between said plate and said spring.

NATHAN STRAUS.

REFERENCES CITED

The following references are of record in the file of this patent:

UNITED STATES PATENTS

| Number | Name | Date |
| --- | --- | --- |
| 1,150,274 | Lathrop | Aug. 17, 1915 |